No. 674,742. Patented May 21, 1901.
T. M. PATTISON, W. F. McCULLOUGH, Jr. & G. H. SWEENEY.
DEVICE FOR WASHING.
(Application filed Oct. 15, 1900.)
(No Model.)

Inventors:
Thomas M. Pattison,
William F. McCullough Jr.
George H. Sweeney
By: Edson Bro's
Attorneys Witnesses:

UNITED STATES PATENT OFFICE.

THOMAS M. PATTISON, WILLIAM F. McCULLOUGH, JR., AND GEORGE H. SWEENEY, OF NEWCASTLE, PENNSYLVANIA.

DEVICE FOR WASHING.

SPECIFICATION forming part of Letters Patent No. 674,742, dated May 21, 1901.

Application filed October 15, 1900. Serial No. 33,111. (No model.)

*To all whom it may concern:*

Be it known that we, THOMAS M. PATTISON, WILLIAM F. McCULLOUGH, Jr., and GEORGE H. SWEENEY, citizens of the United States, residing at Newcastle, in the county of Lawrence and State of Pennsylvania, have invented certain new and useful Improvements in Devices for Washing; and we do hereby declare the following to be a full, clear, and exact description of the invention, such as will enable others skilled in the art to which it appertains to make and use the same.

Our invention relates to certain improvements in devices which for convenience may be termed a "vehicle-washer," "window-washer," and for like purposes, which are readily suggested thereby. It has for its object to greatly expedite and facilitate the washing or cleansing operation, to prevent the wetting of the hands, &c., to effect the ready application of the sponge, brush, or other medium to the nozzle and simplify the retention thereof in place thereon, and to provide for the convenient and expeditious manipulation or handling of the nozzle in performing the cleansing or washing operation, while it is simple and manufactured at the minimum cost.

The nature of the invention consists of the combination of parts, including their construction and arrangement, substantially as hereinafter more fully disclosed and specifically pointed out by the claims.

Figure 1:
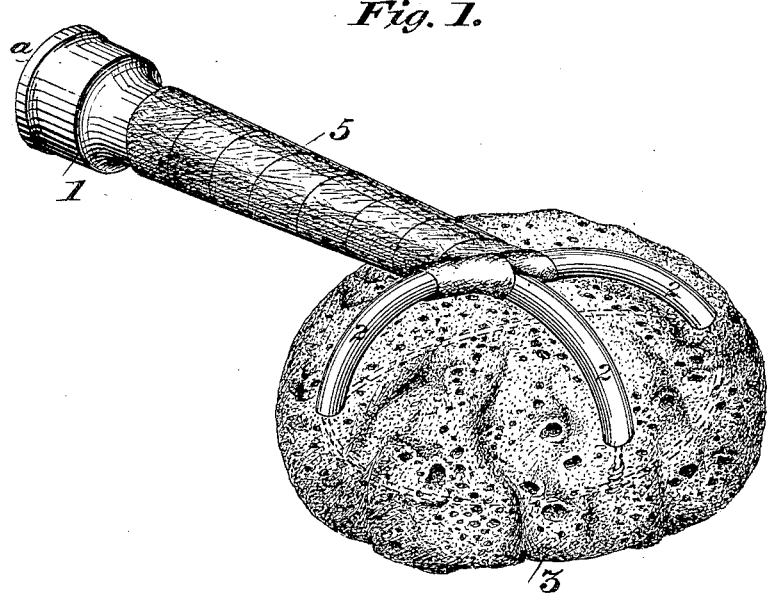
Figure 2:
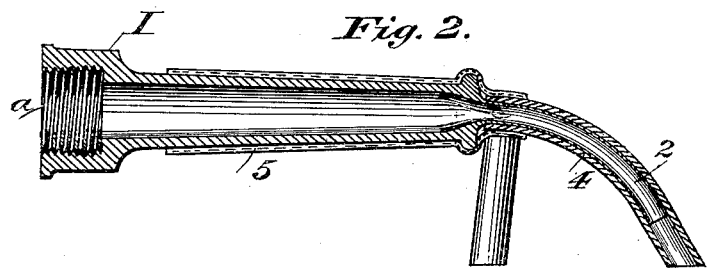
Figure 3:
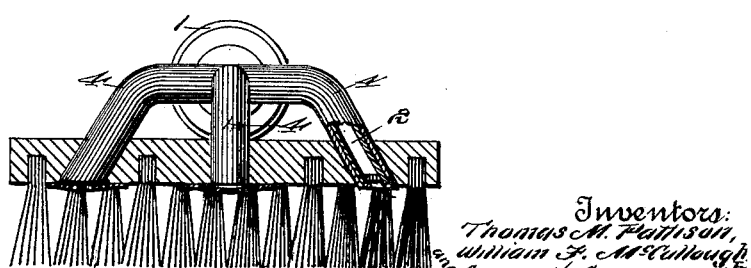

In the accompanying drawings, illustrating the preferred embodiment of our invention, Figure 1 is a perspective view. Fig. 2 is a longitudinal section with the sponge or brush removed. Fig. 3 is a detached view of one of the rubber guards applied to the branches or arms of the nozzle, as employed in our invention.

Latitude is allowed herein as to details, as they may be changed or varied at will without departing from the spirit of our invention and the same yet remain intact and be protected.

In carrying out our invention we provide a nozzle 1, adapted, as usual, by a screw-threaded offset terminal or thimble *a* to be attached to a hose or pipe section (not shown) in turn provided, as ordinarily, with an externally-screw-threaded collar for engagement with said thimble. The nozzle 1 has a series of preferably three branch tubes or arms 2, terminating its outer end, for the delivery or spraying of the water passing therethrough, said branch tubes being preferably curved or extended in the same general lateral direction from the nozzle-body and arranged approximately parallel for a portion of their lengths. Thus these tubes or arms are adapted to flank or receive between them the sponge 3, say, or a brush, said arms or tubes thus providing for ejecting or spraying the water upon the object to be washed or operated on, with said sponge or brush disposed intermediately of the jet or spray of water as the nozzle is properly manipulated by the operator. The sponge or brush may be secured upon the nozzle intermediately of the branch tubes or arms in any suitable way—as, for instance, by means of elastic bands or otherwise. In order to exclude the outer ends of said branch tubes or arms from contact with the vehicle or other object being cleaned, which would otherwise mar or deface the latter, they are each preferably incased within a rubber or elastic closure or tube 4, the outer ends or terminals of said closures extending a short distance beyond the corresponding ends of said branch tubes or arms for that purpose.

The nozzle 1 is enveloped by a suitable closure or tubing 5, formed or made of some material which is a non-conductor of heat and cold, to protect the hands in hot or cold weather in handling the device. The nozzle or device itself also provides against getting the hands in the water or wet in using said nozzle.

It will be observed that in operation the water sprayed or passing out through the branch tubes or arms will engage the surface to be operated on or cleaned, as also the sponge or brush, and that as the nozzle is suitably manipulated the action of the sponge or brush and water will combine to effect the cleaning or washing of said surface, as is apparent.

It is obvious that our invention can be gotten up in attractive styles for use in bathrooms, hospitals, and public bath-houses for use in rubbing the person.

Having thus fully described our invention, what we claim as new, and desire to secure by Letters Patent, is—

1. A nozzle of the character described, having a series of branch tubes or arms, extending laterally therefrom and arranged approximately parallel to each other, elastic tubes or closures incasing said branch tubes or arms, with their outer terminals extending beyond the corresponding ends of said branch tubes, and means applied to said nozzle for cleaning purposes, substantially as set forth.

2. A nozzle of the character described, having a series of branch tubes or arms extending laterally therefrom and arranged approximately parallel to each other, elastic tubes or closures inclosing said branch tubes, means for cleaning purposes applied to said nozzle, intermediately of said branch tubes, and a closure or casing for said nozzle, of some material which is a non-conductor of heat and cold, substantially as set forth.

In testimony whereof we affix our signatures in presence of two witnesses.

T. M. PATTISON.
W. F. McCULLOUGH, Jr.
G. H. SWEENEY.

Witnesses:
HIRAM G. MILLER,
F. A. HOVER.